United States Patent
Tamai et al.

(10) Patent No.: US 6,275,004 B1
(45) Date of Patent: Aug. 14, 2001

(54) SYSTEM FOR BATTERY MODULE BALANCING VIA VARIABLE VOLTAGE DC-DC CONVERTER IN A HYBRID-ELECTRIC POWERTRAIN

(75) Inventors: Goro Tamai, Warren; William Leonard Aldrich, III, Davisburg, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/659,395

(22) Filed: Sep. 11, 2000

(51) Int. Cl.$^7$ .......................... H01M 10/44; H01M 10/46
(52) U.S. Cl. ............................................. 320/118; 320/116
(58) Field of Search ............................... 320/103, 104, 320/116, 117, 118, 119, 134, 136

(56) References Cited

U.S. PATENT DOCUMENTS

| | | | |
|---|---|---|---|
| 5,869,950 | 2/1999 | Hoffman, Jr. et al. | 320/103 |
| 5,905,360 | 5/1999 | Ukita | 320/118 |
| 5,932,990 | 8/1999 | Kaneko | 320/122 |
| 5,982,143 | 11/1999 | Stuart | 320/119 |

*Primary Examiner*—Edward H. Tso
(74) *Attorney, Agent, or Firm*—Christopher DeVries

(57) ABSTRACT

An apparatus for balancing a battery module in a vehicle including a plurality of batteries in the battery module, the plurality of batteries connected in series, the plurality of batteries each having a battery voltage, and at least one battery providing power to an electrical system of the vehicle, an electric generator producing a generator voltage to charge the plurality of batteries, and a DC—DC converter coupled to the electrical generator and receiving power from the electrical generator, the DC—DC converter monitoring at least one of the battery voltages of at least one of the plurality of batteries and controlling the battery voltage of the battery providing power to the electrical system of the vehicle with reference to the monitored battery voltage.

18 Claims, 1 Drawing Sheet

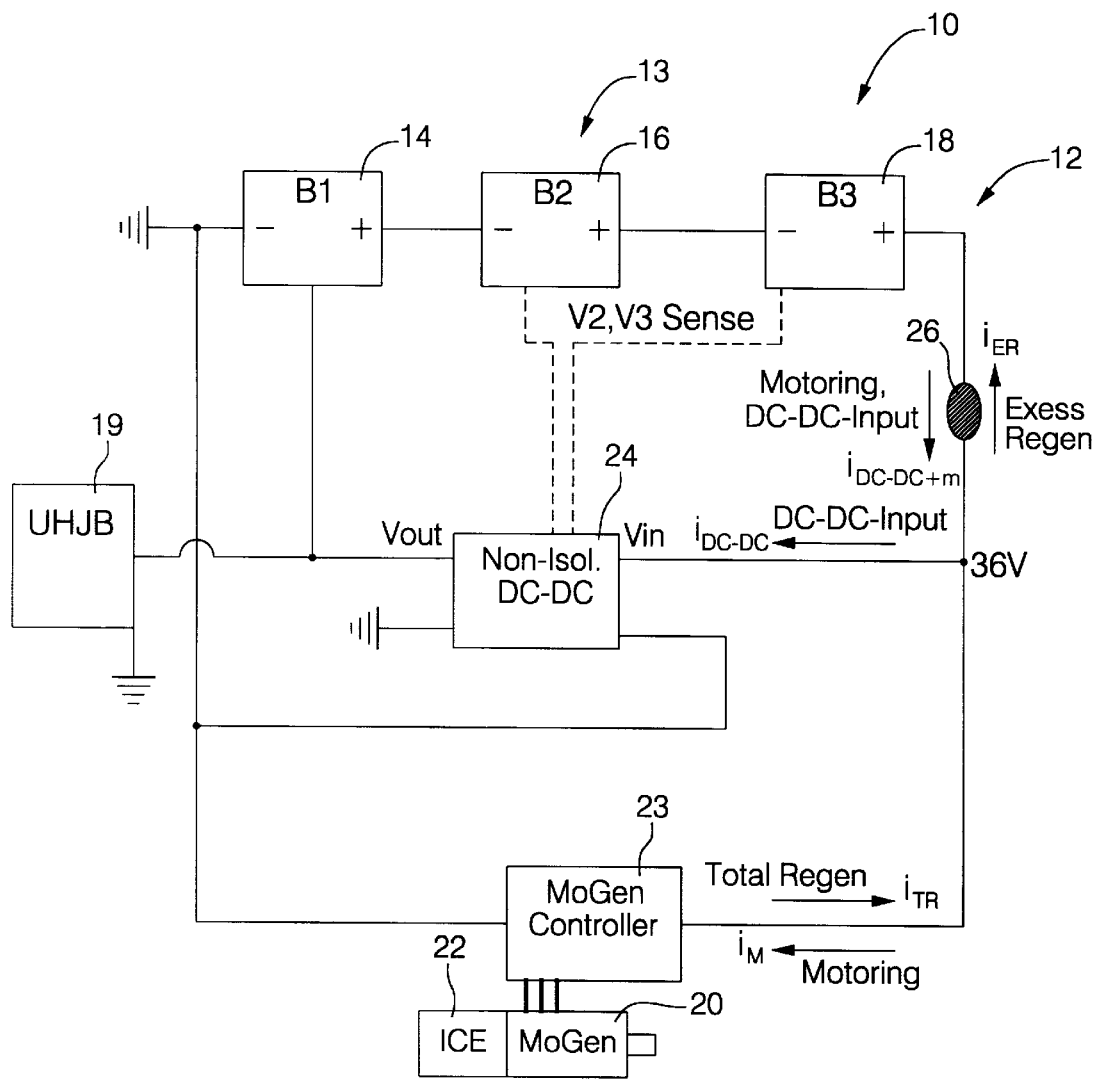

SYSTEM FOR BATTERY MODULE BALANCING VIA VARIABLE VOLTAGE DC-DC CONVERTER IN A HYBRID-ELECTRIC POWERTRAIN

TECHNICAL FIELD

The present invention relates to a battery pack operating in a hybrid-electric powertrain for a vehicle. More specifically, the present invention relates to a method and apparatus to control at least one voltage output of a DC—DC converter to regulate the charge of individual battery modules of the battery pack.

BACKGROUND OF THE INVENTION

In today's automotive market there exist a variety of propulsion or drive technologies used to power vehicles. The technologies include internal combustion engines (ICEs), electric drive systems utilizing batteries and/or fuel cells as an energy source, and hybrid systems utilizing a combination of internal combustion engines and electric drive systems. The propulsion systems each have specific technological, financial, and performance advantages and disadvantages, depending on the state of energy prices, energy infrastructure developments, environmental laws, and government incentives.

The increasing demand to improve fuel economy and reduce emissions in present vehicles has led to the development of advanced hybrid vehicles. Hybrid vehicles are classified as vehicles having at least two separate power sources, typically an internal combustion engine and an electric traction motor. Hybrid vehicles, as compared to standard vehicles driven by an ICE, have improved fuel economy and reduced emissions. During varying driving conditions hybrid vehicles will alternate between separate power sources, depending on the most efficient manner of operation of each power source. For example, a hybrid vehicle equipped with an ICE and an electric motor will shut down the ICE during a stopped or idle condition, allowing the electric motor to propel the vehicle and eventually restart the ICE, improving fuel economy for the hybrid vehicle.

Hybrid vehicles are broadly classified into series or parallel drivetrains, depending upon the configuration of the drivetrains. In a series drivetrain utilizing an ICE and an electric traction motor, only the electric motor drives the wheels of a vehicle. The ICE converts a fuel source to mechanical energy to turn a generator which converts the mechanical energy to electrical energy to drive the electric motor. In a parallel hybrid drivetrain system, two power sources such as an ICE and an electric traction motor operate in parallel to propel a vehicle. Generally, a hybrid vehicle having a parallel drivetrain combines the power and range advantages of a conventional ICE with the efficiency and electrical regeneration capability of an electric motor to increase fuel economy and lower emissions, as compared with a traditional ICE vehicle.

SUMMARY OF THE INVENTION

The present invention includes a vehicle having a parallel hybrid drive system incorporating an ICE and an electric motor generator (MoGen). The MoGen provides for propulsion of the vehicle during certain vehicle operating conditions, replaces an alternator to charge a battery pack in the vehicle, and replaces a conventional starter motor to start the ICE. The hybrid drive system of the present invention will utilize the ICE and MoGen to propel or motor the vehicle during the vehicle conditions which are most efficient for the ICE or MoGen operation. For example, during deceleration or a stopped condition, fuel flow to the ICE will be cut off, as these conditions are some of the least efficient conditions to run the ICE. The MoGen system becomes the active propulsion or motoring system during this fuel cut-off feature and powers the vehicle without noticeably disturbing the operation of the vehicle or sacrificing driveability. The MoGen will propel the vehicle and smoothly transition the vehicle from the idle or stopped state and start the ICE for ICE driving conditions. The transfer of power between the MoGen and ICE or vice versa is transparent to the operator or driver, as the vehicle will perform as if there is only one drive system propelling the vehicle.

During normal operation of the vehicle when the ICE is running, the MoGen will act as an electrical generator to supply electrical power to the vehicle's electrical infrastructure (fans, radios, instrumentation, control, etc.) as well as recharging the battery pack. The battery pack and a power supply, such as a DC—DC converter, will supply power to the vehicle electrical infrastructure the battery pack will power the MoGen when it is operating as the motoring device for the vehicle.

The present invention includes a method and apparatus for controlling the voltage output of a DC—DC converter (Vout) and its relationship to the battery pack and an underhood junction box (UHJB). The UHJB networks the vehicle's electric loads in the vehicle electrical infrastructure. The battery pack will store chemical energy in the form of reactive components that are designed to release the chemical energy as electric power to power the MoGen and the vehicle electrical infrastructure. Typically, a battery pack will comprise a series of individual batteries or battery modules connected in series, parallel, or a combination of both series and parallel, depending on the current and voltage needs of the vehicle.

The battery pack of the present invention is a secondary/rechargeable battery, incorporating the discharge and charge limitations associated with a rechargeable battery such as limited cycle life. The number of times a battery can be recharged and discharged before its fails to meet a selected performance criteria is referred to as the cycle life. A battery is likely to experience differing states of charge (SOC) (the percentage of the full capacity of a battery that is still available for further discharge), in accordance with the power demands of an electric vehicle. These SOCs and the number and depth of the discharges and the recharges will effect the life of the battery. For example, if a lead acid battery is operated in a state where it is only partially charged for an extended period of time, sulfation on the plates of the battery will occur. Sulfation in a lead acid battery involves lead sulfate in the battery developing into large crystals which cannot be readily converted back to an active material, decreasing the charge capacity of the battery and reducing the cycle life of the battery.

The present invention regulates the voltages and the states of charge of battery modules in a battery pack to balance the charging and discharging of the individual battery modules in the battery pack. By regulating the charging and discharging of the individual battery modules in the battery pack, the cycle life of the battery pack will be extended.

BRIEF DESCRIPTION OF THE DRAWINGS

The drawing FIGURE is a diagrammatic drawing of the balancing or charging system of the present invention.

DESCRIPTION OF THE PREFERRED EMBODIMENT

The drawing FIGURE is a diagrammatic drawing of a hybrid vehicle 10, including a battery module balancing system 12 of the present invention. The battery balancing system 12 includes a battery pack 13 having individual battery modules 14, 16, and 18. In the preferred embodiment, the battery pack 13 comprises three 12 volt valve-regulated absorbent glass matt (AGM) lead-acid batteries connected in series to produce a 36 volt nominal bus. In alternate embodiments of the present invention, the battery pack 13 may comprise any known battery technology, including, but not limited to, lithium polymer batteries and nickel metal hydride batteries. The first battery module 14 is chassis grounded and the second and third battery modules 16 and 18 are connected in series with the first battery module 14, as shown in the drawing figure. The respective voltages across the first, second and third battery modules 14, 16, and 18 will be referred to as V1, V2, and V3. While the battery pack 13 has been described as having three battery modules, any number of battery modules of varying voltages are considered within the scope of this invention. Furthermore, a single battery such as a 36 volt battery with a plurality of access points to varying levels of potential (Ground, 12V, and 36V) within it may also be used in the present invention.

In one embodiment of the present invention, the first battery module 14 is tapped to supply power to an underhood junction box (UHJB) 19 which networks and supplies power to the electrical infrastructure of the vehicle 10. The first battery module 14 provides the electrical energy necessary to drive the parasitic loads in the vehicle 10 such as the engine computer while the vehicle 10 is in a nonoperating or parked condition. A concern with tapping off one of the battery modules in a series string, such as found in the battery pack 13 of the present invention, is premature battery pack degradation due to an imbalance in the state of charge (SOC) among the battery modules 14, 16, and 18. The present invention balances the SOC by charging and discharging the battery modules 14, 16, 18 in response to their measured voltages V1, V2, and V3, as will be described later in the specification.

A motor generator (MoGen) 20 is dynamically coupled to an internal combustion engine (ICE) 22 and functions as either a motor to propel the vehicle 10 or a generator to charge the battery pack 13, depending on the operating state of the vehicle 10 (i.e., braking, stopped, or operating at a constant speed on a highway). The MoGen 20 is preferably an AC induction machine but may comprise any known electrical motor/generator technology, including, but not limited to, DC machines, synchronous machines, and switched reluctance machines.

The MoGen 20 in generator mode generates electrical energy that is transferred to the battery pack 13 and the DC—DC converter 24 by a MoGen controller 23. The MoGen controller 23 determines the direction of current flow for the MoGen 20, according to the vehicle operating state. In a regeneration state (such as during braking) or charging condition, current will flow from the MoGen 20, via the MoGen controller 23, to charge the battery pack 13 and provide current to the DC—DC converter 24. In a state where the MoGen 20 is needed to provide propulsion, current will flow from the battery pack 13 to the MoGen 20, via the MoGen controller 23, to power the MoGen 20. In the present embodiment, the MoGen 20 operates at a nominal 36 volts. The operation of the MoGen 20 and its relationship to the battery pack 13 and DC—DC converter 24 is further detailed in the following paragraphs.

This hybrid powertrain of the present invention uses current $i_{ER}$ or "Excess Regen," supplied by the MoGen 20 determined through a single current-measuring device such as a current shunt 26, as the main variable to manage the battery pack 13 state-of-usage (SOU) and SOC. The electrical power flow of the module balancing system 12 can dynamically change among four different modes of battery pack 13 SOU or mode of operation of the MoGen 20, as determined by the MoGen controller 23.

Excess Regen,

Zero Excess Regen,

MoGen 20 Neutral,

MoGen 20 Motoring Discharge.

I. Excess Regen: Of the total regenerative current "Total Regen" $i_{TR}$ provided by the MoGen 20, a portion powers the DC—DC converter 24 $i_{DC-DC}$, and the remaining current (or the Excess Regen $i_{ER}$) recharges the battery pack 13. This is the state that the system 12 will default to for a large majority of its operation time (e.g., cruising on highway). If the battery pack 13 SOC is low, the Excess Regen can be commanded up to a set value; if the battery pack 13 SOC is high, the Excess Regen is tapered down to a minimal value. The upper limit for Excess Regen is determined by the driveability of the vehicle 10; i.e., if the Excess Regen is too high, the powertrain will feel sluggish. This SOU is active anytime the battery 13 SOC is not full, and the MoGen 20 is being backdriven by the ICE 22 or an automotive transmission.

II. Zero Excess Regen: The MoGen 20 provides just enough Total Regen to power the DC—DC converter ($i_{TR}=i_{DC-DC}$). The Excess Regen to charge the battery pack 13 is zero ($i_{ER}=0$). Zero Excess Regen is used when the battery modules 14, 16, and 18 are fully charged. Determination of when the battery modules 14, 16, and 18 are fully charged can be estimated from charge voltage, charge amperage, open-circuit voltage, and charge integration coupled with the Peukert relationship. In actuality, since the DC—DC converter 24 loads can be constantly fluctuating, Excess Regen can not be held to exactly zero. Thus, above a certain voltage threshold (temperature dependent), the current control system changes to a voltage control system. This SOU is active when the battery modules 14, 16, and 18, are at 100% SOC and after crank starting the ICE 22 when the coolant temperature or the SOC of the battery modules 14, 16, and 18 is medium or high. The MoGen 20 is controlled to Zero Excess Regen after the MoGen 20 is done motoring the ICE 22, but before the combustion is deemed fully stabilized.

III. MoGen Neutral: The MoGen 20 is free spinning, thus $i_M=i_{TR}=0$. Since the accessory loads are still supported by the DC—DC converter 24, $i_{DC-DC}$ is still positive. The power for $i_{DC-DC}$ is provided by $i_{DC-DC+m}$, thus the battery pack 13 is being discharged. This SOU is active when: during some transmission shift events where neutral is commanded to eliminate aliasing, due to possible ICE 22 torque variabilities, of automotive transmission adaptives; neutral is commanded at the end of MoGen 20-powered downshift synchronizations, and during a no-MoGen 20 downshifts; after crank starting the ICE 22 when the coolant temperature or the SOC of the battery modules 14, 16, and 18 are low; the MoGen 20 is controlled to neutral after the MoGen 20 is done motoring the ICE 22, but before the combustion is deemed fully stabilized to minimize engine load; and the vehicle 10 is keyed-on with the ICE 22 off.

IV. Motoring Discharge: The MoGen 20 delivers mechanical work to the ICE 22. The electrical charge flowing out of the battery pack 13 $i_{DC-DC+m}$ (in the drawing figure) is the sum of this MoGen 20 motoring load $i_m$ and the DC—DC converter 24 input load $i_{DC-DC}$. This can occur under the following conditions: during key-up crank start, during a hybrid launch from a stop, during a fuel-off downshift, and during an inertia eliminator routine.

The MoGen 20 and battery pack 13 provide power to the DC—DC converter 24 and the DC—DC converter 24 regulates the SOCs of the battery modules 14, 16, and 18 of the battery pack 13. The DC—DC converter 24 will provide a voltage output Vout wired in parallel to the first battery module 14 to charge the first battery module 14 and provide supplemental current capacity to the UHJB 19 when load demands are high. In normal operation, Vout will be substantially equal to 12 volts nominal to charge the first battery module 14. The DC—DC converter 24 may comprise any known DC—DC converter known in the art and is sized according to the current ratings of a vehicle electrical system to which it is coupled. In the preferred embodiment, the first battery module 14 will supply 12 volts nominal to the UHJB and its corresponding parasitic loads. As previously discussed, a concern with tapping off one of the battery modules in a series string is premature battery pack performance degradation. The DC—DC converter 24 will manage the SOC of the battery modules 14, 16, and 18 of the battery pack 13, notably the first battery module 14, to balance the SOC of the battery module 14 to those of battery modules 16, and 18. The DC—DC converter 24 will transfer charge between the battery modules 14, 16, and 18 by monitoring the voltage levels of each battery module 14, 16, and 18 and transferring charge to the first battery module 14 by controlling Vout. Any type of voltage monitor or sensor known in the art is considered within the scope of this invention.

Many hybrid electric powertrain systems control a battery pack's state-of-charge (SOC) near 50 to 80% so that the charge acceptance and efficiency during regenerative braking can be realized. Though this type of strategy can result in energy efficiency gains, long term battery life can be compromised, particularly in the case of lead-acid batteries.

In the preferred embodiment of the present invention, the SOC is dynamically tracked by voltage control and charge integration using the Peukert relationship. The SOC estimation is periodically reset with open-circuit voltage (Voc) readings after a timed shutdown, or via loaded voltage (Vload) during a known discharge action such as an engine start or a transmission downshift synchronization.

To increase the life of the batteries, the battery control system keeps the SOC near full charge, The advantages of implementing such a strategy include:

1. The failure mode of lead-acid batteries through minor gassing is more favorable than that through plate sulfation (realized through consistently using the batteries at partial SOC).
2. The charge imbalance between the battery modules 14, 16, and 18 is not as detrimental if lowest battery is not very low. For example, if two batteries are at 95% SOC, and the other one is 85%, the imbalance is not as detrimental to the health of the entire pack as if two of the batteries were at 40% SOC and the other at 30% SOC.
3. Similar to item 2 above, the parasitic loads through the UHJB 19 may drain battery module 14 during a long park period. If the battery pack 13 were maintained at a high SOC with the battery modules 14, 16, and 18 balanced, the first battery module 14 upon return (after an extended park) will have a greater chance of being high enough to perform its share in the starting tasks.
4. If the SOC is high, the amount of regenerative braking is reduced. Though this can result in a vehicle energy efficiency reduction, the driveability control strategy is greatly simplified since modulation and blending (with the hydraulic brakes) of the regenerative braking torque is not necessary.

To prevent premature battery sulfation, the battery pack 13 may need to be periodically fully charged (e.g. every x keyup cycles). If the SOC is consistently high, the driveability (regenerative braking torque) is consistent from day to day regardless of whether the vehicle 10 is operative normally or if it is in midst of a battery pack 13 equalization routine.

The present invention balances SOC by imposing uniform module voltages across the battery pack 13. There are a plurality of modes of operation for control of Vout for the DC—DC converter 24.

The first mode occurs when Vout is set to match the lower of the voltages of the second and third battery modules 16 and 18, Vout=min(V2, V3). During discharging and/or a low SOC charge of the battery pack 13, the DC—DC converter 24 will set Vout to match the lower of the voltages of the second or third battery modules 16 and 18. Generally, during the discharge of a series string of battery modules such as in the battery pack 13 of the present invention, the weakest or lowest voltage battery module limits the performance of the entire battery pack 13. The DC—DC converter 24 prevents a single module's voltage from dropping off, relative to the remaining battery modules, by transferring charge from the remaining battery modules to the weak module by manipulating Vout. For example, if the first battery module 14 is weakened by the UHJB 19 parasitic loads, the DC—DC converter 24 will transfer charge from the battery modules 16 and 18 to the first battery module 14. The active Vout control is especially valuable when the ICE 22 is off and there is no charging by the MoGen 20 and the first battery module 14 SOC is relatively low.

During low SOC charging (e.g., V1<13 volts), and the SOC is medium to high the 36 volt generating power from the MoGen 20 can more effectively recharge the entire battery pack 13 without undercharging one of the battery modules 14, 16, and 18, especially the second and third battery modules 16 and 18, as it is not possible to individually charge them. If the first battery module 14 voltage V1 is greater than V2 or V3, then the first battery module 14 will provide current to the UHJB 19 electrical load until V1 more closely matches V2 and V3, thus preventing the first module 14 from being overcharged by the MoGen 20.

In a second mode of operation when charging at medium to high SOC with the DC—DC converter 24, Vout is set to match the higher of V2 and V3 to limit the MoGen 20 from overcharging the highest module, Vout=max(V2, V3). For example, if V2=14 volts and V3=15 volts, setting Vout to 14 volts leads to a total battery pack 12 voltage of 43 volts. If the MoGen 20 can provide up to 45 volts, the third battery module 18 can be overcharged (the voltage rise of a battery near full charge increases rapidly) while depriving the first and second battery modules 14 and 16 of a full charge. When Vout is set to the higher of the two voltages V2 and V3 (i.e., 15 volts in this example), V3 would be dragged down by current drain through the DC—DC converter 24 to the first battery module 14. The MoGen 20 regeneration voltage lid would not be hit with a single battery module's voltage sharply rising by itself since a portion of the charge of the third battery module 18 would be transferred to the first battery module 14. This scenario is used when the ICE 22 is running.

In a third mode of operation, if all the battery module voltages V1, V2, and V3 are being drawn low (for example, 8 volts on a 12 volt nominal module), then Vout is set to a minimum voltage such as 9 volts. This minimum voltage is high enough to ensure that the powertrain computer and the ignition/fuel systems remain active. This can be particularly important when starting the ICE 22 on a cold winter morning.

During a MoGen 20 regeneration voltage limit operating mode, the MoGen controller 23 limits the total regeneration voltage Vlid (for example, Vlid=44 volts) to prevent overcharge of the battery pack 13. For this application, Vlid is set to approximately three times the higher voltage of V2 and V3 (i.e., Vlid=3×max (V2, V3)=3×Vout in discrete ratcheted increments of 0.5V (e.g., 41.5V, 42.0V, 42.5V, etc.), although any voltage increment is considered within the scope of this invention. This is done to allow all three battery modules 14, 16, and 18 to converge to close voltage values as the total battery pack 13 is charged. For example, if V3 is 13 volts, and Vout=V2=14 volts and Vlid is set to 45 volts, it is likely that V1 and V2 will climb and leave V3 lower than optimal. However, if Vlid is set to 14*3=42 volts, V1 and V2 would not climb as high, and allow V3 to catch up. Vlid is ratcheted up until the proper top off voltage value is reached (e.g., 14.8 volts per module for a lead acid battery module application).

In alternate embodiments of the present invention, a controller in the vehicle 10 is capable of learning the duty cycles of the battery pack 13 and compensating for varying SOCs. Depending on the sizing of the DC—DC converter 24 and the duty cycle of the loads demanded by the UHJB 19, the first battery module 14 may end up being systematically undercharged. In this case, the engine computer can learn the accessory usage pattern of the driver and adapt the Vout of the DC—DC converter 24 such that the SOC of the first battery module 14 (via running voltages and Voc measurements) is more consistent with that of the second and third battery modules 16 and 18. Instead of matching the lower of V2 and V3, Vout can match successively higher increments between V2 and V3, while monitoring the SOC between the second and third battery modules 16 and 18. Another application of the adaptive Vout is to compensate for parasitic loads (e.g., engine computer) when the vehicle is parked and keyed off.

In another embodiment of the present invention, if the ignition is keyed off, lower power devices such as dome lights and other parasitic loads are powered by the first battery module 14. However, if a high-powered device such as headlights is turned on, or if the voltage of the first battery module 14 drops a calibrated amount below that of V2 and V3, the body computer signals the DC—DC converter 24 to turn on to help power the accessories and to rebalance the battery modules 14, 16, and 18. Once the ICE 22 is running, the DC—DC converter 24 powered by the MoGen 20 powers the UHJB 19 in parallel with the first battery module 14, as previously described.

In a further embodiment of the present invention, if the battery modules 14, 16, and 18 are located such that they will not be at similar temperatures (i.e., one battery module underhood and the remaining battery modules in the trunk), the DC—DC charging scheme can incorporate a temperature compensation algorithm to balance the SOCs for the battery modules 14, 16, and 18.

As a backup measure for monitoring the voltages of the battery modules 14, 16 and 18, if a voltage sense wire(s) of a voltage input or sensor of the present invention becomes disconnected, Vout can be set to the average of V2 and V3 read through the power wires or connections. The V1 voltage is read through the DC—DC converter 24 output cable, and the difference between it and the total battery pack 13 voltages gives twice the average voltage of V2 and V3. Similarly, a single 36 volt battery can be used that has three posts: Ground 12V, 36V. In this case, the Vout would be set equal to the average of V2 and V3. Dedicated voltage taps can be used with the same backup measure mentioned above.

While this invention has been described in terms of some specific embodiments, it will be appreciated that other forms can readily be adapted by one skilled in the art. Accordingly, the scope of this invention is to be considered limited only by the following claims.

What is claimed is:

1. An apparatus for balancing a battery module in a vehicle comprising:
    a plurality of batteries in the battery module, said plurality of batteries connected in series, said plurality of batteries each having a battery voltage, and at least one battery providing power to an electrical system of the vehicle;
    an electric generator producing a generator voltage to charge said plurality of batteries; and
    a DC—DC converter coupled to said electrical generator and receiving power from said electrical generator, said DC—DC converter monitoring at least one of said battery voltages of at least one of said plurality of batteries and controlling said battery voltage of said battery providing power to said electrical system of the vehicle with reference to said monitored battery voltage.

2. The apparatus of claim 1 wherein said electric generator is a motor generator.

3. The apparatus of claim 1 wherein said DC—DC converter is connected in parallel with said battery module to receive power from said battery module, said DC—DC converter further providing a voltage to charge and discharge said battery providing power to said electrical system of the vehicle.

4. The apparatus of claim 1 wherein said plurality of batteries comprises a first battery having a first voltage, a second battery having a second voltage, and a third battery having a third voltage, said battery module having a fourth voltage equal to the sum of the first, second, and third voltages.

5. The apparatus of claim 4 wherein said first battery provides power to said electrical system of the vehicle.

6. The apparatus of claim 5 wherein said DC—DC converter monitors said second and third voltages and controls said first voltage with a voltage output with reference to said second and third voltages.

7. The apparatus of claim 6 wherein said DC—DC converter, during discharging of said battery module, sets said voltage output to match the lower of said second or third voltages.

8. The apparatus of claim 6 wherein said DC—DC converter during charging of said battery module, sets said voltage output to match the higher of said second or third voltages.

9. The apparatus of claim 6 wherein if said first, second, third voltages are below a nominal value then said voltage output is set above said nominal value.

10. The apparatus of claim 9 wherein said nominal value is substantially 8 volts.

11. The apparatus of claim 9 wherein said voltage output is set at substantially 9 volts.

12. The apparatus of claim 4 wherein said fourth voltage is limited to a voltage limit.

13. The apparatus of claim 12 wherein said voltage limit is approximately three times the higher of second or third voltages, and is ratcheted up incrementally.

14. The apparatus of claim 1 wherein said DC—DC converter comprises:

power control circuitry having a voltage output;

a microcontroller coupled to said power control circuitry to control said voltage output; and a plurality of sensors coupled to said microprocessor to detect said voltages of said battery modules.

15. An apparatus for balancing a battery module comprising:

a DC—DC converter including a microcontroller, voltage sensors, and power circuitry;

wherein said DC—DC converter receives power from an electrical generator or the battery module;

wherein the battery module includes a plurality of batteries each said battery having a battery voltage; and wherein said DC—DC converter charges at least one of said plurality of batteries with reference to the voltages of the remaining plurality of batteries.

16. The apparatus of claim 15 wherein at least one of said plurality of batteries powers a vehicle electrical system.

17. A method of regulating a battery module in a vehicle having a plurality of batteries, at least one of said plurality of batteries providing power to a vehicle electrical system, comprising:

monitoring the voltage of at least one of said plurality of batteries;

generating a voltage with an electric generator to charge said plurality of batteries and provide power to a DC—DC converter;

applying a voltage with said DC—DC converter to said at least one of said plurality of batteries providing power to said vehicle electrical system; and varying said applied voltage with respect to said monitored voltage.

18. The method of claim 17 further comprising the step of providing power to an electric motor in a powertrain for driving the vehicle with the battery module.

* * * * *